(12) United States Patent
Gallagher et al.

(10) Patent No.: US 11,145,151 B2
(45) Date of Patent: Oct. 12, 2021

(54) FRICTIONLESS ACCESS CONTROL SYSTEM FOR A BUILDING

(71) Applicant: JOHNSON CONTROLS TYCO IP HOLDINGS LLP, Milwaukee, WI (US)

(72) Inventors: Anne Gallagher, Belfast (GB); Peter Ainsworth, Oxfordshire (GB); Terence Neill, Lisburn (GB); Derek J. Boyes, Craigavon (GB); Youngchoon Park, Brookfield, WI (US); Sudhi R. Sinha, Milwaukee, WI (US); Erik S. Paulson, Madison, WI (US); Richard J. Campero, Morgan Hill, CA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/294,744

(22) Filed: Mar. 6, 2019

(65) Prior Publication Data

US 2019/0279445 A1    Sep. 12, 2019

Related U.S. Application Data

(60) Provisional application No. 62/640,458, filed on Mar. 8, 2018.

(51) Int. Cl.
*G06K 5/00* (2006.01)
*G07C 9/25* (2020.01)
(Continued)

(52) U.S. Cl.
CPC ......... *G07C 9/253* (2020.01); *G06K 9/00288* (2013.01); *G07C 9/25* (2020.01);
(Continued)

(58) Field of Classification Search
CPC  G07F 7/1008; G06Q 20/341; G07C 9/00103; G07C 9/253; G07C 9/37; G06K 9/00288
(Continued)

(56) References Cited

U.S. PATENT DOCUMENTS 9,600,645 B2    3/2017 Fadell et al.
2007/0252001 A1    11/2007 Kail et al.
(Continued)

FOREIGN PATENT DOCUMENTS

WO    WO-98/25229 A1    6/1998

OTHER PUBLICATIONS

International Search Report and Written Opinion Received for Application No. PCT/US2019/021022, dated Jun. 5, 2019, 13 pages.

*Primary Examiner* — Ahshik Kim
(74) *Attorney, Agent, or Firm* — Foley & Lardner LLP

(57) ABSTRACT

An access control system (ACS) for a building includes an access reader, a camera, and an access controller. The access reader is configured to read an access credential provided by a person at an access point and generate ACS data including the access credential. The camera is configured to capture facial recognition system (FRS) data including an image of the person at the access point. The access controller is configured to determine whether the access credential is valid based on the ACS data, determine whether the person is recognized based on the FRS data, grant or deny access to the person through the access point based on whether the access credential is valid and whether the person is recognized, and generate and store one or more of a plurality of access events. Each of the access events corresponds to a different combination of whether the access credential is valid and whether the person is recognized.

25 Claims, 6 Drawing Sheets

(51) Int. Cl.
  *G06K 9/00* (2006.01)
  *G07C 9/28* (2020.01)
  *G07C 9/37* (2020.01)

(52) U.S. Cl.
  CPC ............... *G07C 9/257* (2020.01); *G07C 9/28* (2020.01); *G07C 9/37* (2020.01)

(58) Field of Classification Search
  USPC ........................................................ 235/382
  See application file for complete search history.

(56) References Cited

U.S. PATENT DOCUMENTS

| | | | | |
|---|---|---|---|---|
| 2011/0001604 | A1* | 1/2011 | Ludlow | G07C 9/00031 340/5.6 |
| 2016/0307380 | A1* | 10/2016 | Ho | H04L 65/1069 |
| 2017/0148241 | A1* | 5/2017 | Kerning | H04W 4/12 |
| 2020/0293756 | A1* | 9/2020 | Ainsworth | G06K 9/036 |
| 2021/0049847 | A1* | 2/2021 | Troesch | G07C 9/257 |

* cited by examiner

FRICTIONLESS ACCESS CONTROL SYSTEM FOR A BUILDING

CROSS-REFERENCE TO RELATED APPLICATIONS

This application claims the benefit of and priority to U.S. Provisional Patent Application No. 62/640,458, filed Mar. 8, 2018, the entire contents of which are incorporated herein by reference.

BACKGROUND

The present disclosure relates generally to an access control system (ACS) for a building and more particularly to a smart ACS for a building with frictionless access control. An ACS is a computer-aided and networked system for controlling and monitoring physical access to secured parts of a building or other enclosed area, based on the access credentials and privileges of building users. An ACS may manage groups of buildings in disparate locations and across large campuses. An ACS may use various methods for monitoring, authenticating, and controlling access.

SUMMARY

One implementation of the present disclosure is an access control system (ACS) for a building. The ACS includes an access reader, a camera, and an access controller. The access reader is configured to read an access credential provided by a person at an access point of the building and generate ACS data including the access credential. The camera is configured to capture facial recognition system (FRS) data including an image of the person at the access point. The access controller is configured to determine whether the access credential is valid based on the ACS data, determine whether the person is recognized based on the FRS data, grant or deny access to the person through the access point based on whether the access credential is valid and whether the person is recognized, and generate and store one or more of a plurality of access events. Each of the access events corresponds to a different combination of whether the access credential is valid and whether the person is recognized.

In some embodiments, the access controller is configured to identify a first user identity associated with the access credential in response to a determination that the access credential is valid, identify a second user identity associated with the FRS data in response to a determination that the person is recognized, and compare the first user identity with the second user identity to determine whether the first user identity matches the second user identity.

In some embodiments, the access controller is configured to grant access to the person through the access point and generate an "Access Granted" access event in response to a determination that the first user identity matches the second user identity.

In some embodiments, the access controller is configured to deny access to the person through the access point and generate an "Access Denied" access event in response to a determination that the first user identity does not match the second user identity.

In some embodiments, the access controller is configured to determine whether the person is identified as a person of interest by comparing at least one of the ACS data or the FRS data to one or more identifiers identifying people of interest stored in a database. The access controller may generate a "Person of Interest" access event in response to a determination that the person is identified as a person of interest.

In some embodiments, the access controller is configured to generate and send a message including an instruction to dispatch a security officer to a location at which the person of interest is detected in response to the determination that the person is identified as a person of interest. In some embodiments, the access controller is configured to attach the image of the person at the access point to the message to facilitate visual identification of the person of interest by the security officer.

In some embodiments, the access controller is configured to trigger a second level of authentication in response to a determination that the access credential is valid based on the ACS data but the person is not recognized based on the FRS data. In some embodiments, the second level of authentication includes sending the image of the person captured by the camera at the access point to a digital officer, prompting the digital officer to provide a response approving or denying access to the person, and granting or denying access to the person through the access point based on the response provided by the digital officer.

In some embodiments, the digital officer includes at least one of a security officer or another individual familiar with the person. In some embodiments, the access controller is configured to identify a user identity associated with the access credential and select the individual familiar with the person based on the user identity associated with the access credential.

In some embodiments, the access controller is configured to deny access to the person through the access point and generate an "Unknown Person" access event in response to a determination that the person is not recognized based on the FRS data and no access credential is provided by the person at the access point.

In some embodiments, the access controller is configured to classify the person as an unknown person in response to a determination that the person is not recognized based on the FRS data and no access credential is provided by the person at the access point. The access controller may generate and send a message including an instruction to dispatch a security officer to a location at which the unknown person is detected. In some embodiments, access controller is configured to attach the image of the person at the access point to the message to facilitate visual identification of the unknown person by the security officer.

Another implementation of the present disclosure is an access controller for a building. The access controller includes a communications interface configured to receive access control system (ACS) data including an access credential provided by a person at an access point of the building and facial recognition system (FRS) data including an image of the person at the access point. The access controller includes one or more processors and non-transitory computer readable media containing program instructions. When executed by the one or more processors, the instructions cause the one or more processors to perform including determining whether the access credential is valid based on the ACS data, determining whether the person is recognized based on the FRS data, granting or denying access to the person through the access point based on whether the access credential is valid and whether the person is recognized, and generating and storing one or more of a plurality of access events. Each of the access events corresponds to a different combination of whether the access credential is valid and whether the person is recognized.

In some embodiments, the access controller for a building is configured to identify a first user identity associated with the access credential in response to a determination that the access credential is valid, identify a second user identity associated with the FRS data in response to a determination that the person is recognized, and compare the first user identity with the second user identity to determine whether the first user identity matches the second user identity.

In some embodiments, the access controller for a building is configured to determine whether the person is identified as a person of interest by comparing at least one of the ACS data or the FRS data to one or more identifiers identifying people of interest stored in a database. The access controller may generate a "Person of Interest" access event in response to a determination that the person is identified as a person of interest.

In some embodiments, the access controller for a building is configured to trigger a second level of authentication in response to a determination that the access credential is valid based on the ACS data but the person is not recognized based on the FRS data.

Another implementation of the present disclosure is one or more non-transitory computer readable media containing program instructions. When executed by one or more processors, the instructions cause the one or more processors to perform operations including receiving access control system (ACS) data including an access credential provided by a person at an access point of a building and facial recognition system (FRS) data including an image of the person at the access point, determining whether the access credential is valid based on the ACS data, determining whether the person is recognized based on the FRS data, granting or denying access to the person through the access point based on whether the access credential is valid and whether the person is recognized, and generating and storing one or more of a plurality of access events. Each of the access events corresponds to a different combination of whether the access credential is valid and whether the person is recognized.

In some embodiments, the one or more non-transitory computer readable media contains program instructions to perform further operations including identifying a first user identity associated with the access credential in response to a determination that the access credential is valid, identifying a second user identity associated with the FRS data in response to a determination that the person is recognized, and comparing the first user identity with the second user identity to determine whether the first user identity matches the second user identity.

In some embodiments, the one or more non-transitory computer readable media contains program instructions to perform further operations including determining whether the person is identified as a person of interest by comparing at least one of the ACS data or the FRS data to one or more identifiers identifying people of interest stored in a database, and generating a "Person of Interest" access event in response to a determination that the person is identified as a person of interest.

In some embodiments, the one or more non-transitory computer readable media contains program instructions to perform further operations including triggering a second level of authentication in response to a determination that the access credential is valid based on the ACS data but the person is not recognized based on the FRS data.

Another implementation of the present disclosure is a method for operating an access control system for a building. The method includes receiving access control system (ACS) data including an access credential provided by a person at an access point of a building and facial recognition system (FRS) data including an image of the person at the access point, determining whether the access credential is valid based on the ACS data, determining whether the person is recognized based on the FRS data, granting or denying access to the person through the access point based on whether the access credential is valid and whether the person is recognized, and generating and storing one or more of a plurality of access events. Each of the access events corresponds to a different combination of whether the access credential is valid and whether the person is recognized.

In some embodiments, the method for operating an access control system for a building further includes identifying a first user identity associated with the access credential in response to a determination that the access credential is valid, identifying a second user identity associated with the FRS data in response to a determination that the person is recognized, and comparing the first user identity with the second user identity to determine whether the first user identity matches the second user identity.

In some embodiments, the method for operating an access control system for a building further includes determining whether the person is identified as a person of interest by comparing at least one of the ACS data or the FRS data to one or more identifiers identifying people of interest stored in a database, and generating a "Person of Interest" access event in response to a determination that the person is identified as a person of interest.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Building with Access Control System

Figure 1:
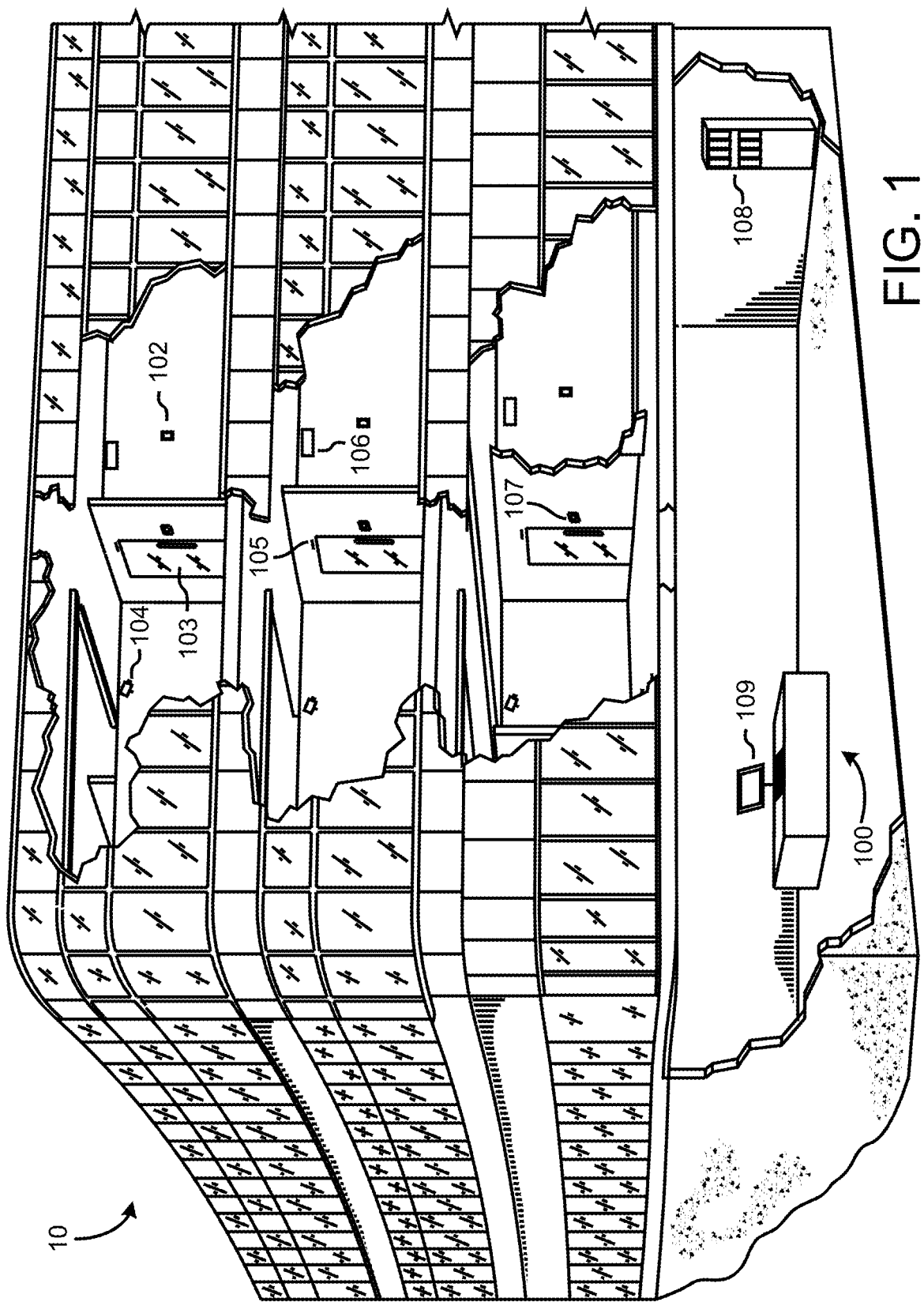
FIG. 1 is a drawing of a building equipped with an access control system (ACS), according to some embodiments.

Referring now to FIG. 1, a building 10 equipped with an access control system (ACS) 100 is shown, according to some embodiments. ACS 100 may be a computer-aided and networked system for controlling and monitoring physical access to secured parts of building 10 or other enclosed areas, based on the access credentials and privileges of building users. ACS 100 can be configured to manage building 10 and/or groups of buildings in disparate locations and across large campuses. ACS 100 may use various methods for monitoring, authenticating, and controlling access.

ACS 100 is shown to include a network of doors 103 (e.g., internal doors, external doors, etc.) or other physical devices that serve as an access point to a physical location within building 10. Although doors 103 are shown in FIG. 1, it should be understood that doors 103 can be replaced with other access control devices (e.g., gates, turnstiles, security checkpoints, etc.) that function as physical barriers or points of entry to a physical space or location. In some embodiments, doors 103 are equipped door sensors 208 (shown in FIG. 2) such as magnetic contacts or other sensors configured to detect whether each of doors 103 is open or closed. Doors 103 may include locking hardware 105 configured to lock and unlock doors 103. Locking hardware 105 may include electric strikes, electric locks, electromagnetic locks, or other controllable devices that can be locked and unlocked automatically (e.g., in response to a control signal received from ACS 100).

ACS 100 is shown to include access reader modules 107 and request to exit (REX) devices 102. Access reader modules 107 may be situated on the external or secured side of a controlled door 103 and may be configured to read an access card or other security credential provided by a user. Access reader modules 107 may include, for example, smartcard readers, magnetic stripe readers, biometric readers, access keypads, and the like. REX devices 102 may be situated on the internal or non-secured side of a controlled door 103 and can be configured to detect the presence of a person exiting a building space. REX devices 102 can include any of a variety of sensing devices including, for example, REX switches, motion detectors, and the like.

In some embodiments, ACS 100 includes security cameras 104 for monitoring controlled or uncontrolled areas in or around building 10. Security cameras 104 can be configured to capture images or video of a person at the location of doors 103 or other access points in ACS 100. The images or video from security cameras 104 are used by ACS 100 to perform facial recognition or other types of visual identity verification. In some embodiments, ACS 100 includes one or more biometric surveillance devices configured to capture biometric data. Such devices may include, for example, a camera configured to capture the visual appearance of a person, a microphone and audio analytics system configured to capture voice prints or other audio data, a fingerprint scanner configured to capture fingerprint data, an iris scanner configured to capture an image of a person's iris, and the like. The biometric surveillance devices may be situated anywhere in building 10 to augment the situational awareness of ACS 100 and may be used as part of a facial recognition system (described in greater detail below).

ACS 100 is shown to include access controllers 106. Access controllers 106 can be configured to receive and process signals from access reader modules 107, REX devices 102, cameras 104, or other devices of ACS 100 that monitor or control access to a building space. Access controllers 106 can cause doors 103 to open or close, lock or unlock, (e.g., by locking or unlocking locking hardware 105), or provide other commands to doors 103 in response to the signals received from access reader modules 107 and REX devices 102, based on the configuration of ACS 100. In some embodiments, access controllers 106 send access data to ACS servers 108.

ACS servers 108 can be configured to receive and process data from access controllers 106, access reader modules 107, REX devices 102, and/or cameras 104. In some embodiments, the data processed by ACS servers 108 include access events generated by access controllers 106 (e.g., allow access events, deny access events, etc.). ACS servers 108 can analyze and process the received data to generate workflows, alerts, or other outputs. In some embodiments, ACS 100 includes one or more client terminals or remote user interfaces 109. A user can interact with client terminals or remote user interfaces 109 to view the access events, alerts, or other outputs generated by ACS servers 108.

Figure 2:
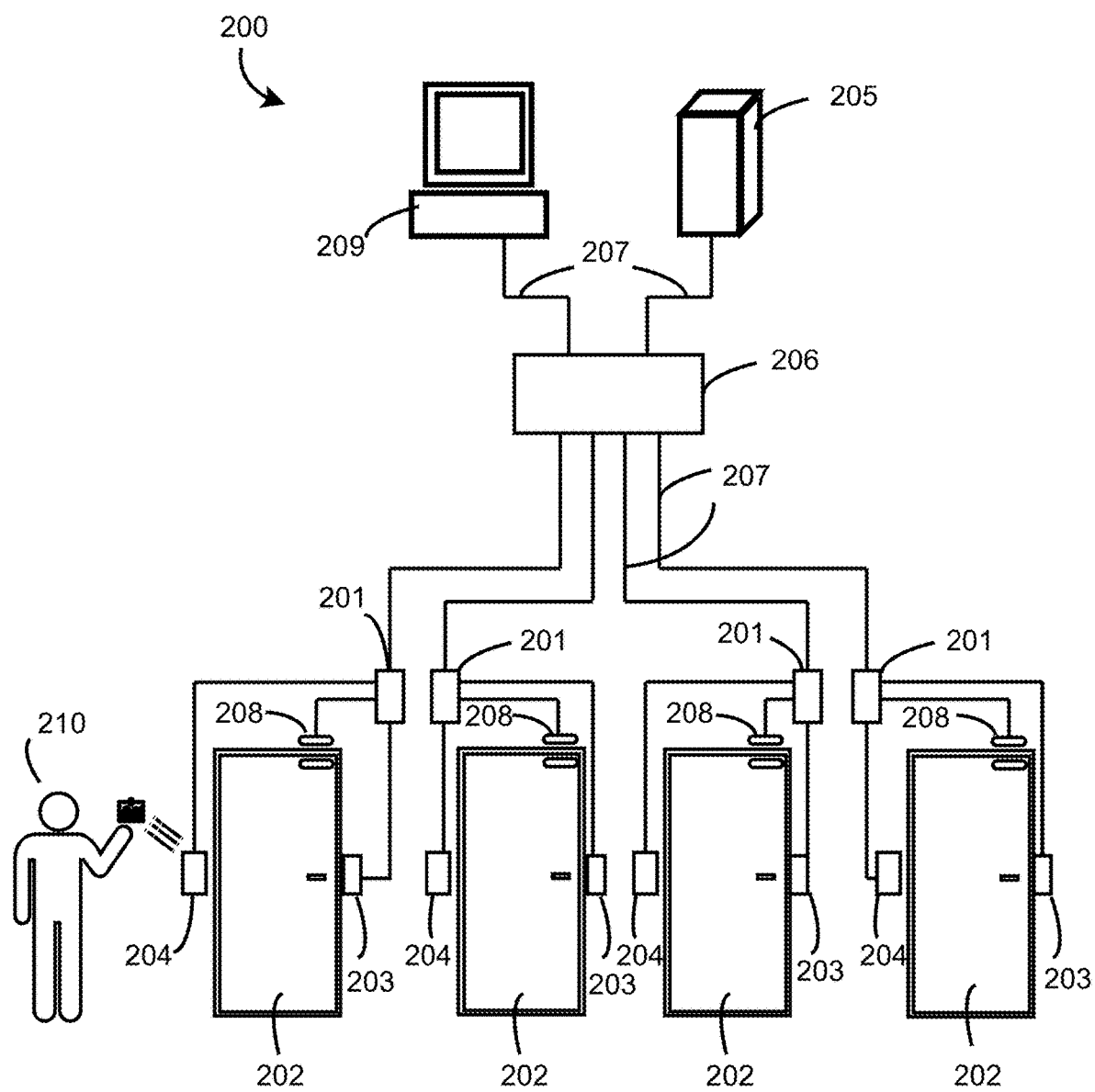
FIG. 2 is a block diagram illustrating several components of the ACS of FIG. 1 in greater detail, according to some embodiments.

Referring now to FIG. 2, a block diagram of another ACS 200 is shown, according to some embodiments. ACS 200 may include some or all of the features and components of ACS 100, as described with reference to FIG. 1, and is shown from the external or secured side of a controlled or secured area. ACS 200 is shown to include a plurality of doors 202. Each of doors 202 is associated with a door lock 203, an access reader module 204, and one or more door sensors 208. Door locks 203, access reader modules 204, and door sensors 208 may be connected to access controllers 201. Access controllers 201 may be connected to a network switch 206 that directs signals, according to the configuration of ACS 200, through network connections 207 (e.g., physical wires or wireless communications links) interconnecting access controllers 201 to ACS server 205. ACS server 205 may be connected to an end-user terminal or interface 209 through network switch 206 and network connections 207.

ACS 200 can be configured to grant or deny access to a controlled or secured area. For example, a person 210 may approach access reader module 204 and present credentials, such as an access card. Access reader module 204 may read the access card to identify a card ID or user ID associated with the access card. The card ID or user ID may be sent from access reader module 204 to access controller 201, which determines whether to unlock door lock 203 or open door 202 based on whether the person 210 associated with the card ID or user ID has permission to access the controlled or secured area.

Figure 3:
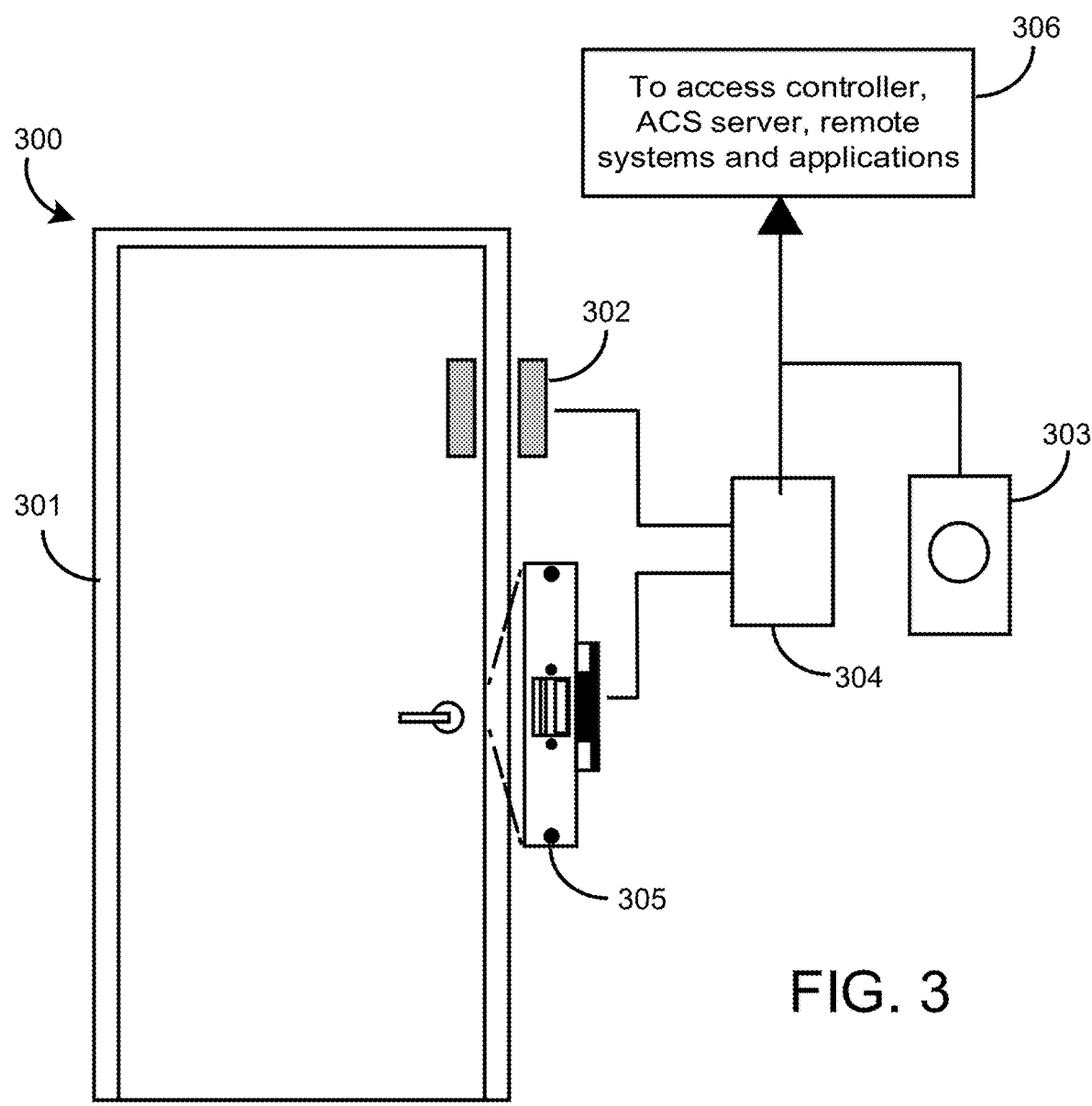
FIG. 3 is a block diagram illustrating a door equipped with a door sensor, a request to exit (REX) device, an access reader module, an electronic lock, and an access controller, which may be implemented as part of the ACS of FIG. 1, according to some embodiments.

Referring now to FIG. 3, a more detailed block diagram illustrating a monitored door 301 in an ACS 300 is shown, according to some embodiments. ACS 300 may include some or all of the features and components of ACS 100 and/or ACS 200, as described with reference to FIGS. 1-2. In ACS 300, door 301 is secured by a door lock 305 which is connected to door sensors or contacts 302, an access reader module 304 (e.g., on the external, secured side), and a REX device 303 (e.g., on the internal, non-secured side). Door lock 305, door sensors or contacts 302, access reader module 304, and REX device 303 may be connected to an access controller 306, ACS server, and/or other systems and applications forming part of ACS 300.

Figure 4A:
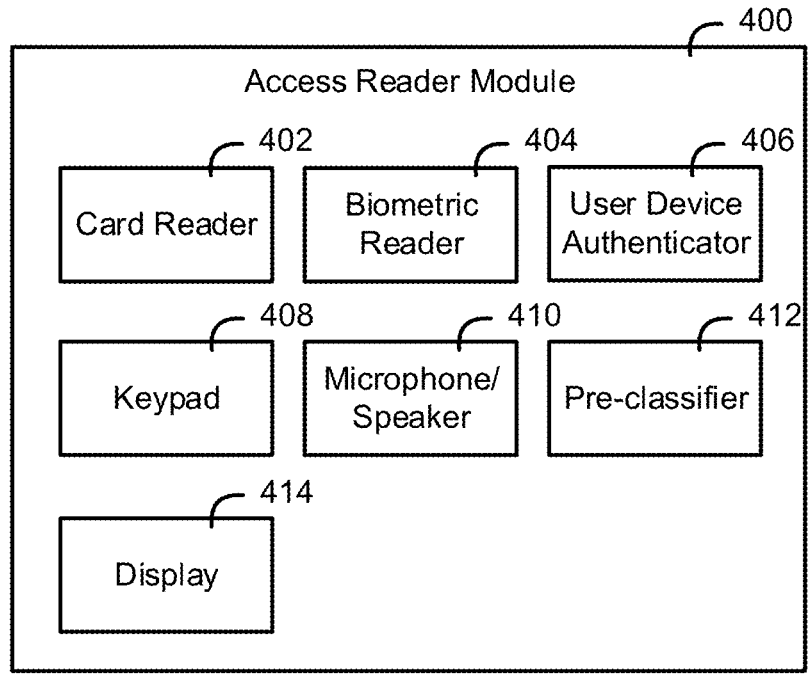
FIG. 4A is a block diagram illustrating the access reader module of FIG. 3 in greater detail, according to some embodiments.

Referring now to FIG. 4A, a block diagram of an access reader module 400 is shown, according to some embodiments. Access reader module 400 may be used in ACS 100 as access reader module 107, in ACS 200 as access reader module 204, and/or in ACS 300 as access reader module 304. Access reader module 400 is shown to include a card reader 402, a biometric reader 404, and a user device authenticator 406. Card reader 402 can be configured to read and decode information contained on an access card. Biometric reader 404 can be configured to read one or more biometrics of a user. For example, biometric reader 404 may include a biometric camera, a fingerprint scanner, or other biometric sensing devices. User device authenticator 406 can be configured to read data contained on a user terminal device such as a smartphone.

Access reader module 400 is shown to include a keypad 408 and a microphone/speaker 410. Keypad 408 may be a user input device configured to receive user input such as an alphanumeric PIN, password, or other entry. In various embodiments, keypad 408 may be a physical keypad, a computer graphic presented via display 414, or a projected image. Microphone/speaker 410 can be configured to receive audio from a user (e.g., a voice print) and can provide audio data to access reader module 400 for use in performing audio analytics. Microphone/speaker 410 can also be used to convey audio messages to a user (e.g., intercom communications.

Access reader module 400 is shown to include a preclassifier 412, and a display 414. Pre-classifier 412 can be configured to correlate input received via other components of access reader module 400 (e.g., image data, audio data, fingerprint data, user input, etc.) with other sensors or electronic devices that provide input to access reader module 400 (e.g., mobile phones, wearable electronic devices, license plate recognition devices, etc.). For example, preclassifier 412 can use automatic license plate recognition data from a camera in a parking lot to filter a set of people down to a smaller set of people associated with license plates currently in the parking lot. This allows access reader module to search a smaller data set of people when attempting to match the input with stored user attributes or biometrics, which may, for example, allow for decreased latency/increased speed in generating an access decision. Display 414 may include an electronic display screen (e.g., a LCD panel, a LED display screen, etc.) that operates to provide visual feedback to a user.

Figure 4B:
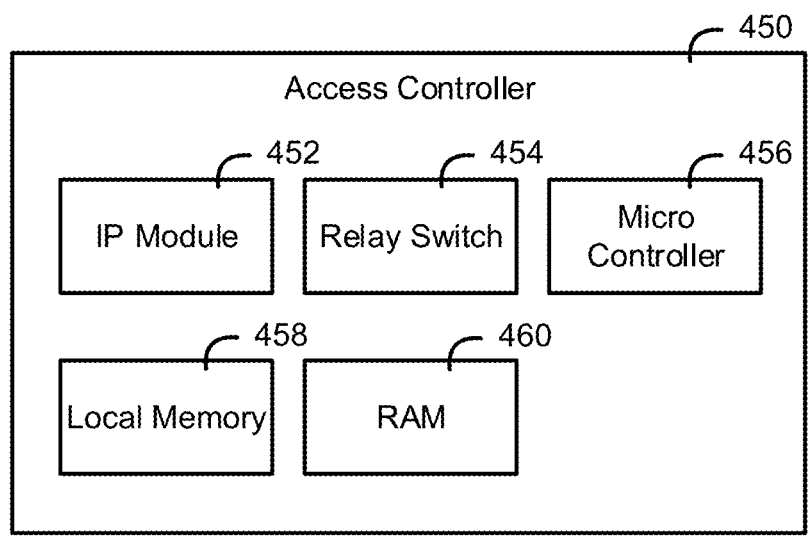
FIG. 4B is a block diagram illustrating the access controller of FIG. 3 in greater detail, according to some embodiments.

Referring now to FIG. 4B, a block diagram of an access controller 450 is shown, according to some embodiments. Access controller 450 may be used in ACS 100 as access controller 106, in ACS 200 as access controller 201, and/or in ACS 300 as access controller 306. Access controller 450 is shown to include an IP module 452, a relay switch 454, a microcontroller 456, local memory 458, and RAM 460. IP module 452 can be configured to communicate data with the rest of the ACS network. Relay switch 454 can be configured to send and receive signals between door sensors, locks, access reader modules, REX devices, ACS servers, and/or other connected systems or devices. Microcontroller 456 can be configured to process signaling and communication data. Local memory 458 can be configured to store local data, whereas RAM can be configured to store and process computations made by access controller 450.

Figure 5:
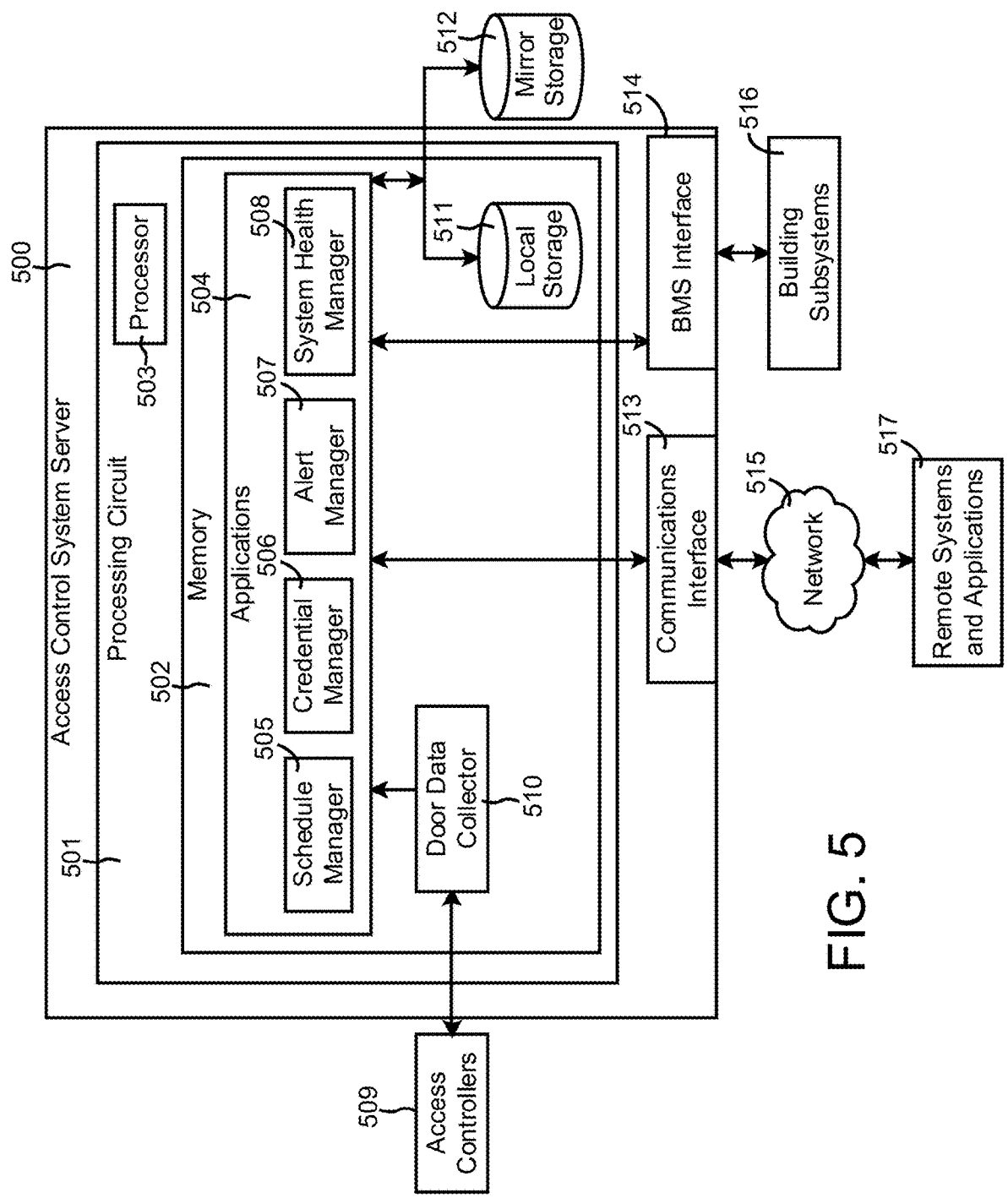
FIG. 5 is a block diagram of an ACS server which can be implemented as part of the ACS of FIG. 1, according to some embodiments.

Referring now to FIG. 5, a block diagram of an ACS server 500 is shown, according to some embodiments. ACS server 500 may be used in ACS 100 as ACS server 108, in ACS 200 as ACS server 205, and/or in ACS 300. ACS server 500 is shown to include a communications interface 513 and a BMS interface 516. Interface 513 may facilitate communications between ACS server 500, access controllers 509, and remote systems and applications 517 (either directly of via a communications network 513) for allowing user control, monitoring, and adjustment to ACS server 500. BMS interface 514 may facilitate communications between ACS server 500 and building subsystems 516 (e.g., HVAC, lighting security, lifts, power distribution, business, etc.).

Interfaces 513-514 can be or include wired or wireless communications interfaces (e.g., jacks, antennas, transmitters, receivers, transceivers, wire terminals, etc.) for conducting data communications with building subsystems 516, access controller 509, or other external systems or devices. In various embodiments, communications via interfaces 513-514 can be direct (e.g., local wired or wireless communications) or via a communications network 515 (e.g., a WAN, the Internet, a cellular network, etc.). For example, interfaces 513-514 can include an Ethernet card and port for sending and receiving data via an Ethernet-based communications link or network. In another example, interfaces 513-514 can include a Wi-Fi transceiver for communicating via a wireless communications network. In another example, one or both of interfaces 513-514 can include cellular or mobile phone communications transceivers. In one embodiment, communications interface 513 is a power line communications interface and BMS interface 514 is an Ethernet interface. In other embodiments, both communications interface 513 and BMS interface 514 are Ethernet interfaces or are the same Ethernet interface.

Still referring to FIG. 5, ACS server 500 is shown to include a processing circuit 501 including a processor 503 and memory 502. Processing circuit 501 can be communicably connected to BMS interface 514 and/or communications interface 513 such that processing circuit 501 and the various components thereof can send and receive data via interfaces 513-514. Processor 503 can be implemented as a general purpose processor, an application specific integrated circuit (ASIC), one or more field programmable gate arrays (FPGAs), a group of processing components, or other suitable electronic processing components.

Memory 502 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 502 can be or include volatile memory or non-volatile memory. Memory 502 can include database components, object code components, script components, or any other type of information structure for supporting the various activities and information structures described in the present application. According to some embodiments, memory 502 is communicably connected to processor 503 via processing circuit 501 and includes computer code for executing (e.g., by processing circuit 501 and/or processor 503) one or more processes described herein. Memory 502 is shown to include several applications 504 including a schedule manager 505, a credential manager 506, an alert manager 507, and a system health manager 508. Memory 502 is also shown to include a door data collector 510 connected to access controllers 509 (e.g., door controllers) and a local storage database 511 connected to a mirror storage database 512.

In some embodiments, ACS server 500 is implemented within a single computer (e.g., one server, one housing, etc.). In various other embodiments ACS server 500 can be distributed across multiple servers or computers (e.g., that can exist in distributed locations). Further, while FIG. 5 shows remote systems and applications 517 as existing outside of ACS server 500, in some embodiments, remote systems and applications 517 can be hosted within ACS server 500 (e.g., within memory 502).

Access Control System Operation

Referring generally to FIGS. 1-5, the operation of an ACS is described. For ease of explanation, specific reference is made to the components of ACS 200 shown in FIG. 2 and ACS server 500 shown in FIG. 5 throughout the remainder of this disclosure. However, it should be understood that the description provided herein may apply to any of the systems or devices illustrated in FIGS. 1-5.

A door lock 203 may be opened or closed in response to electrical signals from an associated access controller 201. Access controller 201 can determine whether or not access should be granted to a particular person 210 presenting their access credentials (e.g., an access card) to an access reader module 204. In some embodiments, the determination made by access controller 201 may be based on the access permissions of person 210, which may be stored in an ACS database (e.g., within ACS server 205 or mirror storage 512) and communicated to access controller 201. In some embodiments, the determination made by access controller 201 is based on various parameters or permissions associated with the monitored area. Some users may have access to some areas, but not others. Access controller 201 may grant or deny access based on the time of day or week and may restrict access during public holidays. ACS server 500 or access controller 201 can be configured to processes access requests in accordance with such rules.

Access reader module 204 can be configured to read the credentials of person 210 (e.g., from an access card) and pass the data to access controller 201. Access controller 201 may pass the credential data to ACS server 500 via a communications network. ACS server 500 can compare the credential data with credential data stored in credential manager 506 and can make a determination as to whether the credentials are valid. ACS server 500 may communicate either a positive or negative response to access controller 201. Access controller 201 may then either grant access (by causing door lock 203 to open) or deny access. In some embodiments, access reader module 204 may include a user interface for communicating the outcome of the decision (e.g., grant access or deny access) via a display screen, lighting element, and/or audible signals.

In some embodiments, the decision to grant or deny access and the resulting action performed by access controller 201 (e.g., unlocking door look 203 or keeping door lock 203 locked) is logged in ACS server 500 as an access event for monitoring and reporting. In instances where an invalid access attempt is made (e.g., a user with insufficient privileges requests access using an access card), access controller 201 may not cause door 202 to be unlocked and may indicate an invalid access attempt. Access controller 201 may then send event data to ACS server 500 recording this event. The event data associated with the access event may include the ID of the cardholder (e.g., person 210), the ID of door 202, the time of the event, the reason for denial of access, and/or other parameters or attributes of the access event.

One example of an access event is an "Access Granted" (AG) event, which may occur when a valid user with sufficient privileges is granted access. Another example of an access event is an "Access Denied" (AD) event, which may occur when a valid user without sufficient privileges is denied access. Another example of an access event is a "Door Forced Open" (DFO) event, which may occur a door was opened without the use of valid access credentials (e.g., door 202 is manually forced open by person 210 without access controller 201 first granting access). Another example of an access event is a "Door Held Open" (DHO) event, which may occur when a door has been held or kept open for longer than a predetermined amount of time. Another example of an access event is a "Door Malfunction" (DM) event, which may occur when a physical or logical failure occurs in some part of ACS 200 associated with a particular door 202 (e.g., a failure of door lock 203 to properly open when requested by access controller 201). Another example of an access event is a "Person of Interest" (POI) notification, which may occur when the person 210 detected by ACS 200 is flagged as a person of interest. Another example of an access event is an "Unknown Person" (UP) notification, which may occur when the person 210 detected by ACS 200 is unable to be identified. Another example of an access event is a "Tailgating" or anti-passback notification, which may occur when multiple people pass through the door 202 or other access point, but only one of the people presents a valid access credential.

The data collected by ACS 200 and/or ACS server 500 may be used to generate reports and may be further processed to generate insights into door use or other security matters. Such reports and/or data may be displayed on a user interface for system monitors. Analysis of door use data may focus on types and times of event, specific doors, specific users etc. ACS 200 may interact with a video security surveillance system. For example, if there is a DFO event for a particular door 202, ACS 200 may attach a video recording of that door 202 at the time of the DFO event and associate it with an alarm event.

Access Control with Facial Recognition

In some embodiments, ACS 200 uses a facial recognition system (FRS) to authorize user access to a door 202. A FRS may use a person's unique facial features, such as the shape of their face, as an access credential to identify and authenticate the person's access to a controlled area. Such facial recognition data can be captured be cameras or other facial recognition devices located at the access point. In some embodiments, the FRS uses input from a variety of different sensors or devices to augment the facial image data. Examples of such devices include audio sensors, wearable devices, mobile devices, and the like. The FRS may use input from a license plate recognition system to determine which people have arrived at the building and may use input from a location tracking system to determine the locations of various people in the building. For example, the FRS can detect each person's mobile device or license plate and may only search for those people's facial data in the FRS database. ACS 200 can use FRS data to derive actionable insights into a building's security environment and risk profile. Access control data (e.g., card scan data, user-entered passwords or PIN numbers, biometric data, etc.) can be combined and correlated with FRS data and/or other data to enhance the overall security of a monitored system. In addition, access control data and FRS data can be used to improve on existing risk management workflows and decisions.

In some embodiments, ACS 200 uses a combination of access control data and FRS data to recognize, verify, and/or authenticate a person's identity. Access control data can be collected when a person 210 scans an access card at an access reader module 204. Access reader module 204 can read a card ID from the access card and provide the card ID to access controller 201. FRS data can be collected by a camera located nearby access reader module 204 and configured to capture an image of the person's face. The FRS data can be provided to access controller 201 or ACS server 500 and analyzed by access controller 201 or ACS server 500 to determine whether the FRS data matches the profile of any person recognized by access controller 201 or ACS server 500.

In some embodiments, ACS 200 (e.g., ACS controller 201 or ACS server 500) uses a combination of ACS data (e.g., card scan data) and FRS data (e.g., facial recognition results, license plate recognition data, mobile device detection data, etc.) to trigger automated workflows and derive security insights. The combination of ACS data and FRS data can contribute to a more contextual and situationally aware risk analysis of a site environment. In some embodiments, ACS data and FRS data may be used in conjunction with other data for risk scoring by a risk analysis engine (described in greater detail below).

In some instances, the ACS data may indicate that a person 210 has scanned a valid card (e.g., a card belonging to a person recognized by ACS 200) at an access reader module 204 and may include the card ID or user ID associated with the valid card. If the card is valid, the ACS data may also indicate whether the person 210 associated with the valid card (e.g., "John Smith," "User ID 123," etc.) has permission to access the space controlled by the access reader module 204 at which the access card was scanned. In other instances, the ACS data may indicate that the person 210 has scanned an invalid card (e.g., a card that has been deactivated or was never associated with ACS 200). If the card is invalid, the ACS data may indicate that the access card or person 210 who scanned the invalid card was not recognized by access reader module 204.

In some instances, the FRS data may indicate that facial recognition was successful (i.e., the visual appearance of person 210 matches a facial profile stored by ACS 200) and may include the user ID associated with the recognized person 210. If person 210 is recognized, the FRS data may also indicate whether the recognized person 210 (e.g., "John Smith," "User ID 123," etc.) is a person of interest (POI). In other instances, the FRS data may indicate that facial recognition was unsuccessful (i.e., the visual appearance of person 210 does not match a facial profile stored by ACS 200) and therefore person 210 is unrecognized. ACS 200 can be configured to compare the ACS data with the FRS data to determine whether both the ACS data and the FRS data identify the same person 210 (i.e., whether the ACS data and FRS data match).

ACS 200 can create various types of access events (and may grant or deny access to the controlled space) based on the correlation between the ACS data and the FRS data. Table 1 below outlines several scenarios A-F that may occur and how each scenario may be identified by ACS 200 based on the correlation between the ACS data and the FRS data. Table 1 also identifies the type of access event created by ACS 200 for each scenario.

Scenario A may occur when the FRS data indicates that facial recognition was successful, the ACS data indicates that the card presented by person 210 is valid, and ACS 200 determines that both the FRS data and the ACS data identify the same person. In scenario A, ACS 200 may determine whether the identified person is permitted to access the controlled space. If the person is permitted to access the controlled space, ACS 200 may grant access and create an "Access Granted" event. However, if the person is not permitted to access the controlled space, ACS 200 may deny access and create an "Access Denied" event.

Scenario B may occur when the FRS data indicates that facial recognition was successful, the ACS data indicates that the card presented by person 210 is valid, but ACS 200 determines that both the FRS data and the ACS data do not match (i.e., the FRS data and the ACS data identify different people). This may occur when a first person presents a second person's access card at an access reader module 204. In scenario B, ACS 200 may deny access and may create a "False Positive" and/or "Access Denied" event. In some embodiments, ACS 200 sends an automated message to the second person (e.g., via email or SMS) to alert the second person that his or her access card was scanned by the first person. ACS 200 may also send such an automated message to a security officer.

Scenario C may occur when the FRS data indicates that facial recognition was successful but the ACS data indicates that the card presented by person 210 is invalid. If the person 210 recognized by the FRS data is a person of interest (POI), ACS 200 may deny access and create an "Access Denied" and/or "Person of Interest" event. In some embodiments, ACS 200 sends an automated message to a security officer alerting the security officer of the person of interest.

Scenario D may occur when the FRS data indicates that facial recognition was unsuccessful but the ACS data indicates that the card presented by person 210 is valid. This may occur when a person's appearance has changed or is not recognized (e.g., new haircut, sunglasses, wearing a hat, blurred image) even though the person 210 has presented a valid access card. In scenario D, ACS 200 may trigger a second level of authentication in order to confirm the identity of the person 210. For example, ACS 200 may send an automated message to a security officer or other individual who is familiar with the person 210 (i.e., a digital officer) associated with the valid access card. The automated message may include an image of person 210 captured by a camera at the time the access card was validated. The digital officer can reply to the message (e.g., with "Approve" or "Deny") in order to grant or deny access. If the second level of authentication is successful (e.g., an "Approve" reply is received), ACS 200 may grant access and create an "Access Granted" event and a "False Negative" event. ACS 200 may also use the FRS data to update the stored appearance of the person 210 so that future facial recognition attempts will be successful, given the new or changed appearance of person 210. However, if the second level of authentication is unsuccessful (e.g., a "Deny" reply is received), ACS 200 may deny access and create an "Access Denied" event.

Scenario E may occur when the FRS data indicates that facial recognition was unsuccessful and the ACS data indicates that the card presented by person 210 is invalid (or no card was presented by person 210). Scenario E may occur when person 210 is an unknown person who is not authorized to access the building. In scenario E, ACS 200 may deny access and create an "Access Denied" event. In some embodiments, ACS 200 sends an automated message to a security officer or establishes a communications link with the security officer (e.g., via an intercom at the point of entry) who can determine whether access should be granted or denied to person 210. If the security officer determines that person 210 should be allowed entry, ACS 200 may grant access and create an "Access Granted" event. However, if the security officer determines that person 210 should be denied entry, ACS 200 may deny access and create an "Access Denied" event.

Scenario F may occur when the FRS data indicates that facial recognition was successful and the ACS data indicates that the card presented by person 210 is valid, but the recognized person 210 is flagged as a person of interest. In scenario F, ACS 200 may deny access and create an "Access Denied" and/or "Person of Interest" event. In some embodiments, ACS 200 sends an automated message to a security officer alerting the security officer of the person of interest.

TABLE 1

Example ACS and FRS Scenarios

| Scenario | Facial Recognition Successful? | Valid Card? | FRS/Card Match? | Person of Interest? | Unknown Person? | Event Type |
|---|---|---|---|---|---|---|
| A | Yes | Yes | Yes | No | No | Access Granted or Denied |
| B | Yes | Yes | No | No | No | False Positive, Access Denied |
| C | Yes | No | No | Yes | No | Access Denied, POI Alert |
| D | No | Yes | No | No | Yes | False Negative, Access Granted or Denied (Secondary Authentication) |
| E | No | No | No | No | Yes | Access Denied, Unknown Person |
| F | Yes | Yes | Yes | Yes | No | Access Denied, POI Alert |

In some embodiments, ACS 200 includes a complex event processing engine and/or a risk analysis engine, which can be used by ACS 200 to automatically generate risk-scored alert types for improved real-time security and site management. Examples of such an event processing engine and/or a risk analysis engine are described in detail in U.S. Provisional Patent Application No. 62/627,698 filed Feb. 7, 2018, and U.S. Provisional Patent Application No. 62/627,677 filed Feb. 7, 2018. The entire disclosures of both these patent applications are incorporated by reference herein.

In some embodiments, ACS 200 provides information that can be used to calculate risk for a building or other entities associated therewith (e.g., people in the building, equipment in the building, etc.). For example, ACS 200 may create a loitering event in response to detecting an unknown person at a door for a predetermined amount of time (e.g., scenario E). Based on situational information about the loitering event (e.g., time of day, frequency of recurrence, etc.), ACS 200 may cause the risk score of the building to be adjusted to reflect potential changes in the vicinity. As another example, ACS 200 can detect patterns of anomalies such as a cluster of false positive events (e.g., scenario B) which may indicate systemic issues with ACS 200 (e.g., card readers malfunctioning, database errors, etc.). As another example, ACS 200 can detect patterns of false negative events (e.g., scenario D), which may indicate that a camera used to capture the FRS data is malfunctioning or has been tampered with.

In some embodiments, ACS 200 is configured to receive input from a risk analysis engine such as that disclosed in U.S. Provisional Patent Application No. 62/627,698 filed Feb. 7, 2018. For example, ACS 200 may receive a risk score for the building in which ACS 200 is located. The risk score may impact or alter the standard operating procedures (SOPs) triggered in one or more of scenarios A-F. For example, if the risk engine has updated the building's risk score to a high level, the SOP for a false positive event (e.g., scenario D) may be changed by ACS 200 to automatically deny such access attempts.

Figure 6:
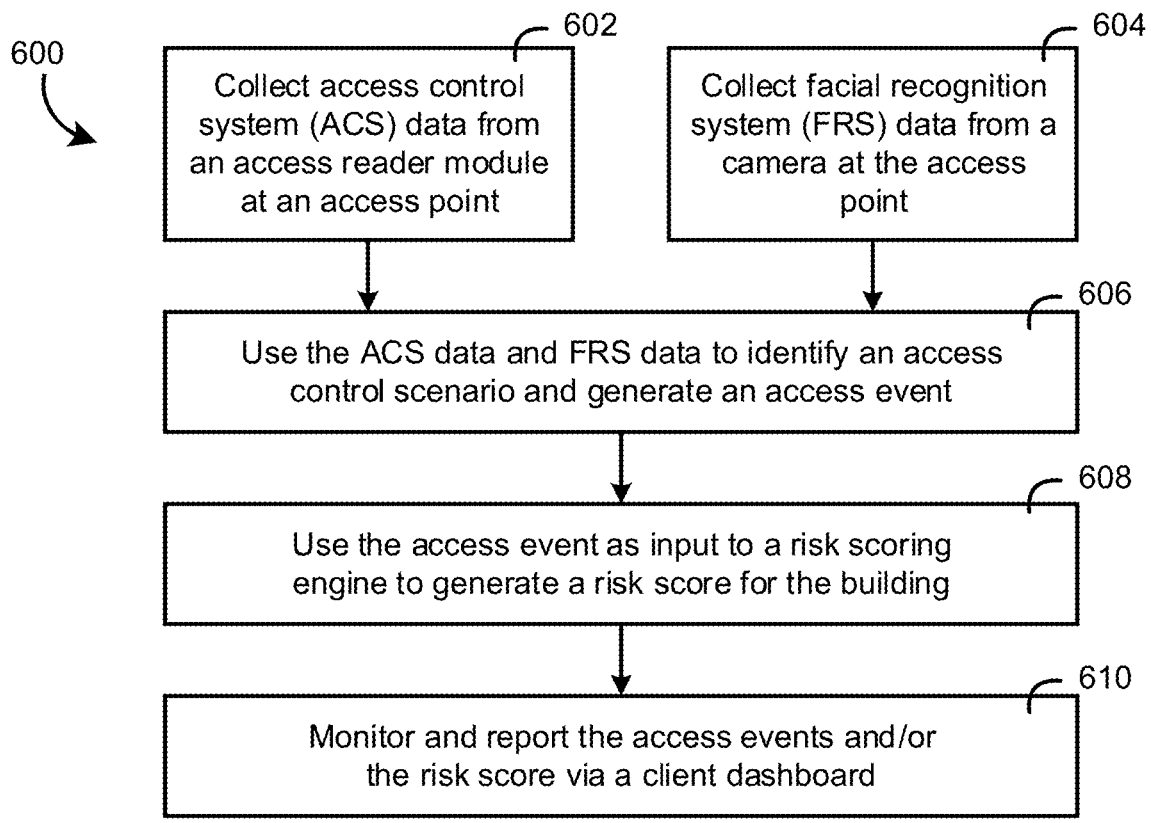
FIG. 6 is a flowchart of a process for using ACS data and facial recognition system (FRS) data to analyze risk for a building, according to some embodiments.

Referring now to FIG. 6, a flowchart of a process 600 for using ACS data and FRS data to analyze risk for a building is shown, according to some embodiments. Process 600 is shown to include collecting ACS data from an access reader module 204 (step 602) and collecting FRS data from a camera or other image/video capture device (step 604). The ACS data and FRS data can be used by an access controller or other component of ACS 200 to identify a corresponding scenario (e.g., one of scenarios A-F in Table 1) and generate a corresponding access event (step 606). The access events generated by ACS 200 can be provided as input to a risk analysis engine which uses the access events to generate or update a risk score for the building and/or the entities associated therewith (step 608). The access events and/or the risk scores can then be monitored and reported to a user via a client dashboard (step 610).

While the aforementioned embodiments refer specifically to facial recognition, it should be understood that, in various implementations, one or more other types of biometric data can be used instead of or in addition to facial recognition data. For example, in various implementations of the aforementioned systems and methods, different biometric data such as fingerprint data, hand or other body geometry biometric data, retina scan data, iris scan data, signature analysis data, voice analysis data, DNA data, typing recognition data, walking gait analysis data, and/or any other type of biometric data may be utilized. In one particular example, the FRS data discussed above could be replaced with fingerprint data, such that access control decisions and workflows discussed above could be performed using the ACS data in conjunction with analysis of fingerprint data obtained from a fingerprint scanner. In another example, the FRS data could be supplemented with fingerprint data, such that access control decisions are made in consideration of all three of facial recognition data, fingerprint data, and ACS data (e.g., card reader data); for example, access may be granted automatically only if the user is identified by all three methods and the three identities match.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An access control system (ACS) for a building, the ACS comprising:
    an access reader configured to read an access credential provided by a first person at an access point of the building and generate ACS data comprising the access credential;
    a camera, installed in the building, configured to capture facial recognition system (FRS) data comprising an image of the first person at the access point;
    an access controller configured to:
        determine whether the access credential is valid based on the ACS data;
        determine whether the first person is recognized based on the FRS data;
        grant or deny access to the first person through the access point based on whether the access credential is valid and whether the first person is recognized;
        generate and store one or more of a plurality of access events, each of the access events corresponding to a different combination of whether the access credential is valid and whether the first person is recognized; and
    wherein, responsive to the access credential being determined invalid and/or the first person not being recognized, the access controller is configured to (i) send an automated message to a security officer, a second person, or an individual familiar with the first person or to (ii) establish a communications link with the security officer based on a combination of whether the access credential is invalid and whether the first person is not recognized.

2. The ACS of claim 1, wherein the access controller is configured to:
    identify a first user identity associated with the access credential in response to a determination that the access credential is valid;
    identify a second user identity associated with the FRS data in response to a determination that the first person is recognized; and
    compare the first user identity with the second user identity to determine whether the first user identity matches the second user identity.

3. The ACS of claim 2, wherein the access controller is configured to grant access to the first person through the access point and generate an "Access Granted" access event in response to a determination that the first user identity matches the second user identity.

4. The ACS of claim 2, wherein the access controller is configured to deny access to the first person through the access point and generate an "Access Denied" access event in response to a determination that the first user identity does not match the second user identity.

5. The ACS of claim 1, wherein the access controller is configured to:
    determine whether the first person is identified as a person of interest by comparing at least one of the ACS data or the FRS data to one or more identifiers identifying people of interest stored in a database; and
    generate a "Person of Interest" access event in response to a determination that the first person is identified as a person of interest.

6. The ACS of claim 5, wherein the access controller is configured to generate and send a message comprising an instruction to dispatch a security officer to a location at which the person of interest is detected in response to the determination that the first person is identified as a person of interest.

7. The ACS of claim 6, wherein the access controller is configured to attach the image of the first person at the access point to the message to facilitate visual identification of the person of interest by the security officer.

8. The ACS of claim 1, wherein the access controller is configured to trigger a second level of authentication in response to a determination that the access credential is valid based on the ACS data but the first person is not recognized based on the FRS data.

9. The ACS of claim 8, wherein the second level of authentication comprises:
    sending the image of the first person captured by the camera at the access point to a digital officer;
    prompting the digital officer to provide a response approving or denying access to the first person; and
    granting or denying access to the first person through the access point based on the response provided by the digital officer.

10. The ACS of claim 9, wherein the digital officer comprises at least one of a security officer or another individual familiar with the first person.

11. The ACS of claim 10, wherein the access controller is configured to:
  identify a user identity associated with the access credential; and
  select the individual familiar with the first person based on the user identity associated with the access credential.

12. The ACS of claim 1, wherein the access controller is configured to deny access to the first person through the access point and generate an "Unknown Person" access event in response to a determination that the first person is not recognized based on the FRS data and no access credential is provided by the first person at the access point.

13. The ACS of claim 1, wherein the access controller is configured to:
  classify the first person as an unknown person in response to a determination that the first person is not recognized based on the FRS data and no access credential is provided by the first person at the access point; and
  generate and send a message comprising an instruction to dispatch a security officer to a location at which the unknown person is detected.

14. The ACS of claim 13, wherein the access controller is configured to attach the image of the first person at the access point to the message to facilitate visual identification of the unknown person by the security officer.

15. An access controller for a building, the access controller comprising:
  a communications interface configured to receive access control system (ACS) data comprising an access credential provided by a first person at an access point of the building and facial recognition system (FRS) data, from a camera installed in the building, comprising an image of the first person at the access point;
  one or more processors; and
  non-transitory computer readable media containing program instructions that, when executed by the one or more processors, cause the one or more processors to perform operations comprising:
    determining whether the access credential is valid based on the ACS data;
    determining whether the first person is recognized based on the FRS data;
    granting or denying access to the first person through the access point based on whether the access credential is valid and whether the first person is recognized;
    generating and storing one or more of a plurality of access events, each of the access events corresponding to a different combination of whether the access credential is valid and whether the first person is recognized; and
    wherein, responsive to the access credential being determined invalid and/or the first person not being recognized, the program instructions further cause the one or more processors to (i) send an automated message to a security office, a second person, or an individual familiar with the first person or to (ii) establish a communications link with the security officer based on a combination of whether the access credential is invalid and whether the first person is not recognized.

16. The access controller of claim 15, the operations further comprising:
  identifying a first user identity associated with the access credential in response to a determination that the access credential is valid;
  identifying a second user identity associated with the FRS data in response to a determination that the first person is recognized; and
  comparing the first user identity with the second user identity to determine whether the first user identity matches the second user identity.

17. The access controller of claim 15, the operations further comprising:
  determining whether the first person is identified as a person of interest by comparing at least one of the ACS data or the FRS data to one or more identifiers identifying people of interest stored in a database; and
  generating a "Person of Interest" access event in response to a determination that the first person is identified as a person of interest.

18. The access controller of claim 15, the operations further comprising triggering a second level of authentication in response to a determination that the access credential is valid based on the ACS data but the first person is not recognized based on the FRS data.

19. One or more non-transitory computer readable media containing program instructions that, when executed by one or more processors, cause the one or more processors to perform operations comprising:
  receiving access control system (ACS) data comprising an access credential provided by a first person at an access point of a building and facial recognition system (FRS) data, from a camera installed in the building, comprising an image of the first person at the access point;
  determining whether the access credential is valid based on the ACS data;
  determining whether the first person is recognized based on the FRS data;
  granting or denying access to the first person through the access point based on whether the access credential is valid and whether the first person is recognized;
  generating and storing one or more of a plurality of access events, each of the access events corresponding to a different combination of whether the access credential is valid and whether the first person is recognized; and
  wherein, responsive to the access credential being determined invalid and/or the first person not being recognized, the program instructions further cause the one or more processors to (i) send an automated message to a security officer, a second person, or an individual familiar with the first person or to (ii) establish a communications link with the security officer based on a combination of whether the access credential is invalid and whether the first person is not recognized.

20. The one or more non-transitory computer readable media of claim 19, the operations further comprising:
  identifying a first user identity associated with the access credential in response to a determination that the access credential is valid;
  identifying a second user identity associated with the FRS data in response to a determination that the first person is recognized; and
  comparing the first user identity with the second user identity to determine whether the first user identity matches the second user identity.

21. The one or more non-transitory computer readable media of claim 19, the operations further comprising:
  determining whether the first person is identified as a person of interest by comparing at least one of the ACS data or the FRS data to one or more identifiers identifying people of interest stored in a database; and generating a "Person of Interest" access event in response to a determination that the first person is identified as a person of interest.

22. The one or more non-transitory computer readable media of claim 19, the operations further comprising triggering a second level of authentication in response to a determination that the access credential is valid based on the ACS data but the first person is not recognized based on the FRS data.

23. A method for operating an access control system for a building, the method comprising:

receiving access control system (ACS) data comprising an access credential provided by a first person at an access point of the building and facial recognition system (FRS) data, from a camera installed in the building, comprising an image of the first person at the access point;

determining whether the access credential is valid based on the ACS data;

determining whether the first person is recognized based on the FRS data;

granting or denying access to the first person through the access point based on whether the access credential is valid and whether the first person is recognized;

generating and storing one or more of a plurality of access events, each of the access events corresponding to a different combination of whether the access credential is valid and whether the first person is recognized; and wherein, responsive to the access credential being determined invalid and/or the first person not being recognized, the method further comprises (i) sending an automated message to a security officer, a second person, or an individual familiar with the first person or (ii) establishing a communications link with the security officer based on a combination of whether the access credential is invalid and whether the first person is not recognized.

24. The method of claim 23, the method further comprising:

identifying a first user identity associated with the access credential in response to a determination that the access credential is valid;

identifying a second user identity associated with the FRS data in response to a determination that the first person is recognized; and comparing the first user identity with the second user identity to determine whether the first user identity matches the second user identity.

25. The method of claim 23, the method further comprising:

determining whether the first person is identified as a person of interest by comparing at least one of the ACS data or the FRS data to one or more identifiers identifying people of interest stored in a database; and generating a "Person of Interest" access event in response to a determination that the first person is identified as a person of interest.

\* \* \* \* \*